No. 647,135. Patented Apr. 10, 1900.
G. B. FRENCH.
BEET HARVESTER.
(Application filed Sept. 25, 1899.)
(No Model.) 2 Sheets—Sheet 1.
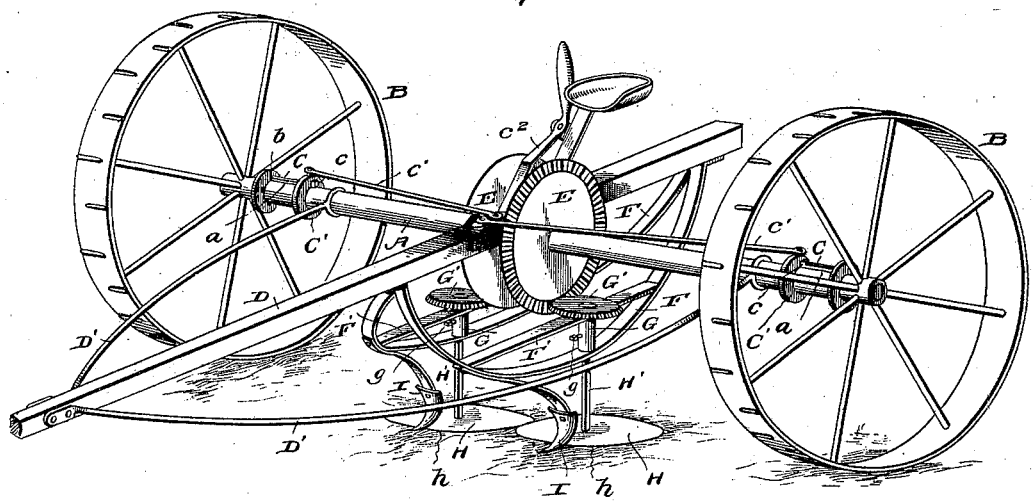
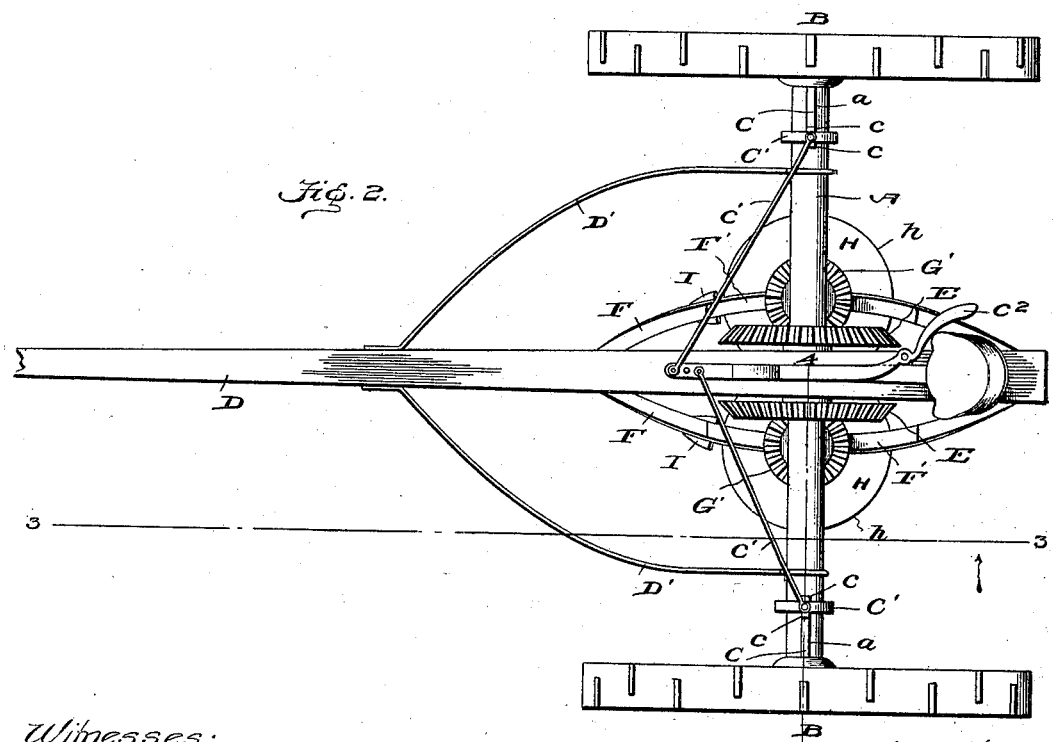
Witnesses:
Inventor
Geo. B. French
By
Attys.
THE NORRIS PETERS CO., PHOTO-LITHO., WASHINGTON, D. C.

No. 647,135. Patented Apr. 10, 1900.
G. B. FRENCH.
BEET HARVESTER.
(Application filed Sept. 25, 1899.)

(No Model.) 2 Sheets—Sheet 2.

Witnesses: Inventor
Geo. B. French
By Edson Bros,
Attys.

UNITED STATES PATENT OFFICE.

GEORGE B. FRENCH, OF FREMONT, NEBRASKA.

BEET-HARVESTER.

SPECIFICATION forming part of Letters Patent No. 647,135, dated April 10, 1900.

Application filed September 25, 1899. Serial No. 731,658. (No model.)

*To all whom it may concern:*

Be it known that I, GEORGE B. FRENCH, a citizen of the United States, residing at Fremont, in the county of Dodge and State of Nebraska, have invented certain new and useful Improvements in Beet-Harvesters; and I do hereby declare the following to be a full, clear, and exact description of the invention, such as will enable others skilled in the art to which it appertains to make and use the same.

My invention relates to a new and useful improvement in beet-harvesters; and its object is to provide a light machine of simple and durable construction which may be readily operated by any desired power and which is adapted to cut off the tops of sugar-beets, chicory, and other vegetables prior to their removal from the ground.

It is a well-known fact in communities where beets are raised for the purpose of being manufactured into sugar that sugar-beets in order to be in marketable condition must be delivered free of all leaves and tops and of that portion of the beet above a plane circumscribed by a line drawn around the beet at the base of the bottom-leaf scars. This insures the highest percentage of saccharine matter and the minimum amount of those salts which retard the crystallization in the manufacturing process, together with a purity coefficient of the highest degree.

Beets usually grow with the base of their bottom leaves substantially on a line with the surface of the ground, and I have therefore been enabled to provide a machine of peculiar construction whereby the undesirable portion of the beet may be accurately removed.

To these ends my invention consists in the novel construction and combination of parts hereinafter more fully described and claimed and illustrated in the accompanying drawings, showing the preferred form of my invention, and in which—

Figure 3:
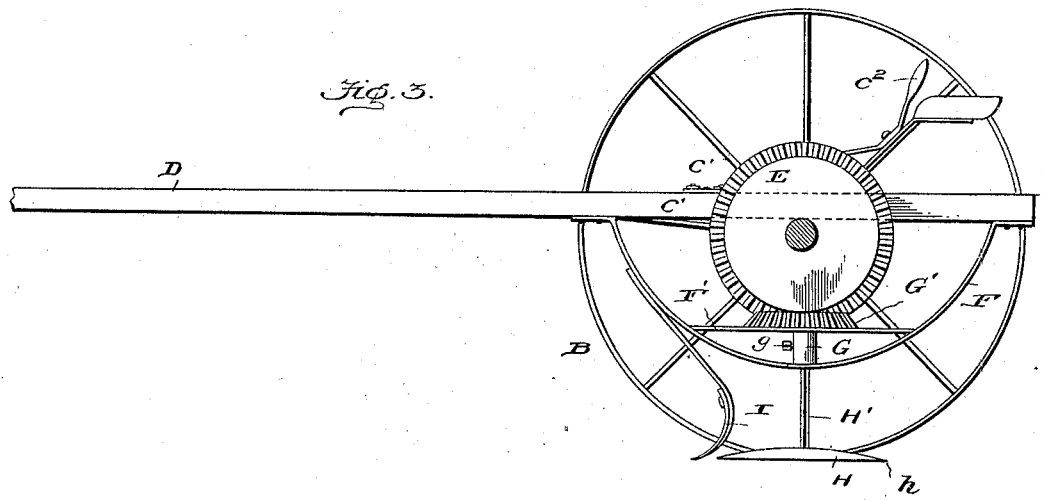
Figure 4:
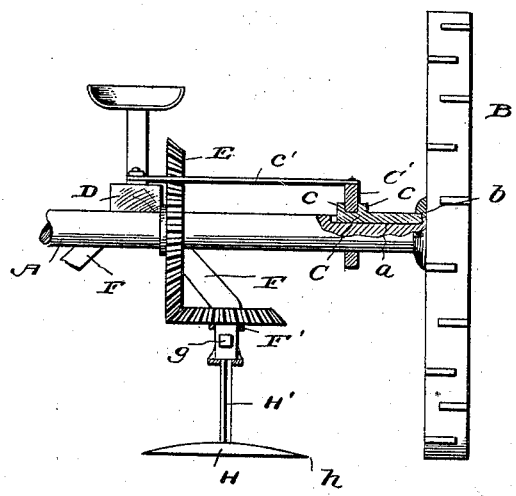

Figure 1 is a perspective view of the harvester. Fig. 2 is a top plan view thereof. Fig. 3 is a section on line 3 3, Fig. 2. Fig. 4 is a section on line 4 4, Fig. 2.

Referring to said figures by letters of reference, A is the axle, upon which are loosely mounted the wheels B. Suitable mechanism is provided whereby when desired the wheels B may be locked upon the axle, causing the same to revolve therewith. In the drawings I have shown one form of mechanism for this purpose. The axle A is provided with a key-seat $a$ near each end, within each of which is slidably mounted a key C, having shoulders $c$, between which is loosely mounted a collar C', embracing both the key and the axle. These collars are connected by means of rods $c'$ to any suitable operating-lever $c^2$, whereby the two keys may be thrown into or out of engagement with notches $b$ in the hubs of the wheels at one and the same time. It is obvious that the axle and its keys will revolve within the collars C' when locked to the wheels and revolve therewith. The axle A is journaled to the draft-beam D and may be braced to it in any suitable manner, as by the rods D'.

Fixed upon the axle A at each side of the beam D and revolving with said axle are the beveled pinions E. Secured to the beam D are two pendent brackets F, each having a cross-arm F', and said brackets and their arms are adapted to support and form bearings for a tubular shaft G, to the upper end of which is secured a horizontally-disposed bevel-pinion G', adapted to mesh with one of the pinions E.

The shaft H' of a disk H is adapted to be inserted into each of the tubular shafts, said disk-shaft being adjustable within the tubular shaft, and may be locked in a desired position therein by means of a set-screw $g$, as shown. The disk-shafts H' are preferably square in cross-section, whereby they are prevented from revolving within the angular passage in the tubular shaft G.

The disks H are rigidly secured to the lower ends of the shafts H' and are provided with cutting edges $a$, which preferably slightly overlap each other. If desired, however, these disks may revolve in the same plane with their cutting edges, nearly meeting each other. Adjustably secured to the brackets F and curving downwardly and forwardly therefrom directly in front of the center of the disks H are the shovels I, adapted to clear the way for the disks H and their shafts and prevent the clogging thereof.

In operation it is obvious that when power is communicated to the shaft A from the wheels B the disks H will be revolved toward each other and cut off the undesirable portion of the beet, and when it is desired to suspend the operation of the disks all that is necessary is to uncouple the wheels from the shaft as described.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having thus fully described my invention, what I claim, and desire to secure by Letters Patent, is—

1. In a beet-harvester, the combination with the beam, of the brackets secured thereto, disks supported from said brackets, and shovels secured to the brackets and suspended in front of said disks, substantially as described.

2. In a beet-harvester the combination of the beam, an axle journaled thereto, wheels mounted upon the axle, means for locking and unlocking the wheels from the axle, pinions secured to the axle, a bracket suspended from the beam, a horizontally-disposed pinion meshing with the axle-pinion and supported by said bracket, cutting-disks adjustably secured to the shafts of the horizontal pinions, and shovels secured to the brackets and arranged in the path of the center of the disks, substantially as described.

In testimony whereof I affix my signature in presence of two witnesses.

GEORGE B. FRENCH.

Witnesses:
A. K. DAME,
EDNA BRUGH.